United States Patent [19]
DeCecca et al.

[11] Patent Number: 5,950,029
[45] Date of Patent: Sep. 7, 1999

[54] VARIABLE FORMAT VIEWFINDER MASK AND LENS COVER IN CAMERA

[75] Inventors: Michael L. DeCecca, Fairport; Mark A. Lamphron, Rochester, both of N.Y.

[73] Assignee: Eastman Kodak Company, Rochester, N.Y.

[21] Appl. No.: 09/037,433

[22] Filed: Mar. 10, 1998

[51] Int. Cl.⁶ .............................. G03B 7/26; G03B 13/10; G03B 17/00
[52] U.S. Cl. .......................... 396/380; 396/448; 396/205
[58] Field of Search .................................... 396/378, 380, 396/435, 436, 448, 176, 205, 6

[56] References Cited

U.S. PATENT DOCUMENTS

| | | | |
|---|---|---|---|
| 2,584,912 | 2/1952 | Palmer | 396/373 |
| 2,881,684 | 4/1959 | Bröhl et al. | 396/380 |
| 3,552,283 | 1/1971 | Babcock et al. | 396/50 |
| 4,283,132 | 8/1981 | Engelsmann et al. | 396/448 |
| 4,283,860 | 8/1981 | Rucker | 396/277 |
| 4,349,266 | 9/1982 | Maeda et al. | 396/544 |
| 4,490,031 | 12/1984 | Mineshima | 396/71 |
| 4,609,270 | 9/1986 | Kohno et al. | 396/74 |
| 4,716,427 | 12/1987 | Shyu | 396/380 |
| 4,973,997 | 11/1990 | Harvey | 396/315 |
| 5,066,971 | 11/1991 | Kodaira | 396/52 |
| 5,086,311 | 2/1992 | Naka et al. | 396/436 |
| 5,339,125 | 8/1994 | Fridman et al. | 396/317 |
| 5,659,826 | 8/1997 | Kameyama | 396/378 |
| 5,754,906 | 5/1998 | Yoshida | 396/448 |

*Primary Examiner*—Safet Metjahic
*Assistant Examiner*—J. K. Han
*Attorney, Agent, or Firm*—Roger A. Fields

[57] ABSTRACT

A camera including a viewfinder for viewing a subject to be photographed, a masking a device for the viewfinder having a number of different format mask configurations, a taking lens for forming an image of the subject, and a lens cover for the taking lens, is characterized in that the masking device and said lens cover are supported to be moved at the same time for any one of the mask configurations to be in a masking position partially masking the viewfinder when the lens cover is not covering the taking lens and for every one of the mask configurations to be respective non-masking positions not partially masking the viewfinder when the lens cover covers the taking lens.

5 Claims, 5 Drawing Sheets

VARIABLE FORMAT VIEWFINDER MASK AND LENS COVER IN CAMERA

FIELD OF THE INVENTION

The invention relates generally to the field of photography, and in particular to cameras. More specifically, the invention relates to a variable format viewfinder mask and lens cover in a camera.

BACKGROUND OF THE INVENTION

Reloadable and recent one-time-use cameras for the new "Advanced Photo System" give you not just one print format, but a choice of three. For the classic proportions of a 35 mm print, the photographer chooses the "C" format. For a wider view, the full-frame "H" format is chosen. And for an even wider look, the "P" format is chosen to provide a sweeping panoramic print. The camera records the choice of print format magnetically and/or optically on the filmstrip for each exposure. The photofinisher's equipment then reads this data, and automatically prints each print in the selected "C", "H" or "P" format. A "C" format print is typically 4×6 inches. An "H" format print is typically 4×7 inches. And a "P" format print is typically 4×10 inches or 4×11.5 inches.

No matter which format is selected in the camera, "C", "H" or "P", the exposed image areas on the filmstrip are always in the "H" format. This allows re-prints to be made in any of the three formats rather than just in the selected format.

In order for the photographer to know how much of the subject being photographed will be included in the "C", "H" or "P" format print, the viewfinder in the camera includes a variable state masking device, such as a mechanical masking blade or an electronic masking liquid crystal display, for framing the subject according to the particular format that is selected. A manually operated format selector is provided to change the state of the masking device to the view the desired format in the viewfinder. This is shown, for example, in U.S. Pat. No. 4,973,997 issued Nov. 27, 1990.

In inexpensive reloadable cameras and one-time-use cameras, implicity of the variable state masking device and the manually operated format elector is an ever-present goal.

SUMMARY OF THE INVENTION

A camera comprising a viewfinder for viewing a subject to be hotographed, a masking a device for the viewfinder having a number of different format mask configurations, a taking lens for forming an image of the subject, and a lens cover for the taking lens, is characterized in that:

the masking device and said lens cover are supported to be moved at the same time for any one of the mask configurations to be in a masking position partially masking the viewfinder when the lens cover is not covering the taking lens and for every one of the mask configurations to be respective non-masking positions not partially masking the viewfinder when the lens cover covers the taking lens.

Preferably, the masking device and the lens cover are united to form a single piece.

Also, the camera includes a flash switch that is capable of changing state to energize an electronic flash, and the single piece includes a number of switch actuators whose particular number is one more than the number of the mask configurations for individually changing the state of the flash switch to energize the electronic flash as the single piece is moved.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
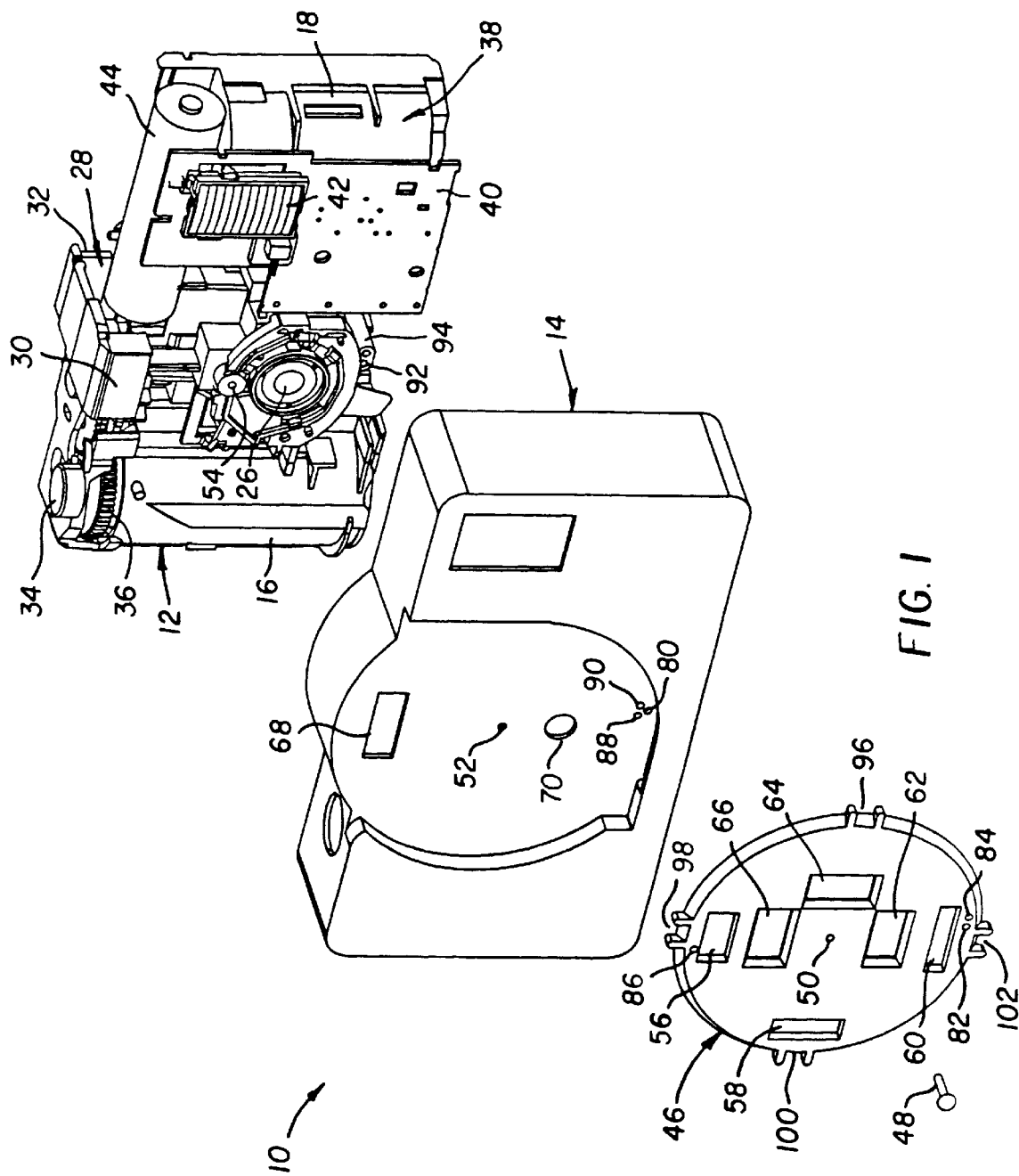
FIG. 1 is an exploded front perspective view of a one-time-use camera according to a preferred embodiment of the invention.
Figure 2:
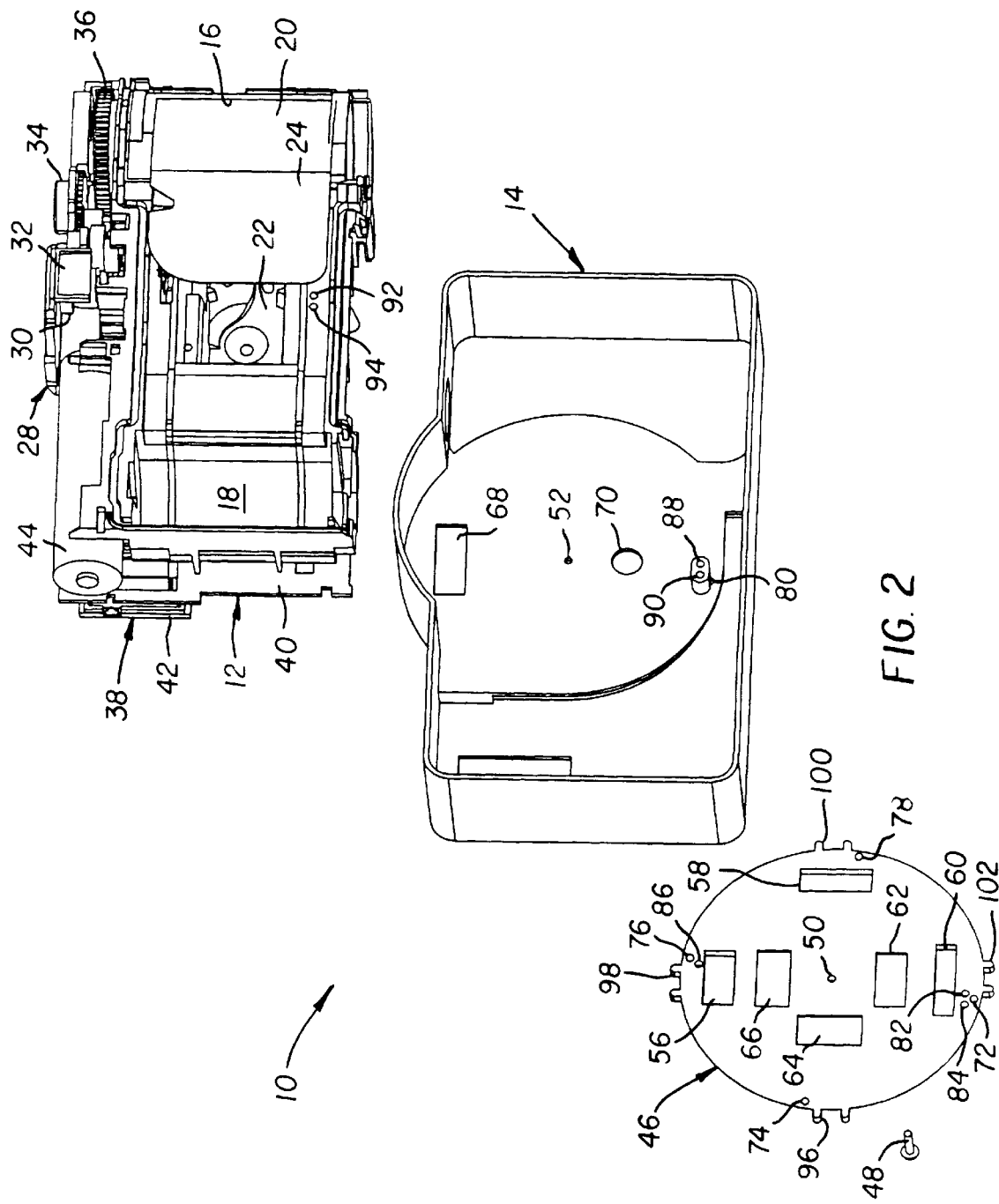
FIG. 2 is an exploded rear perspective view of the one-time-use camera shown in FIG. 1.

Referring now to the drawings, FIGS. 1 and 2 show a one-time-use camera 10 comprising a plastic opaque main body part 12, and a pair of plastic opaque front and rear cover parts 14 (rear cover part not shown) which connect to one another to house the main body part between them in order to complete the camera assembly. The main body part 12 is adapted to be nested in the front cover part 14, and the rear cover part is intended to be fitted to the main body part 12 to make the main body part light-tight.

As shown in FIGS. 1 and 2, the main body part 12 has a pair of cartridge receiving and unexposed film roll chambers 16 and 18 for a known "Advanced Photo System" film cartridge 20 and for an unexposed film roll coiled about a film supply spool (not shown). The cartridge receiving and unexposed film roll chambers 16 and 18 are located at opposite sides of a backframe opening 22 in which successive frames of a filmstrip 24 are exposed during picture-taking. The filmstrip 24 is originally on a cartridge spool (not shown) inside the film cartridge 20, but for the most part is pre-wound onto the film supply spool during camera manufacture. After each picture is taken, the exposed frame of the filmstrip 24 is wound onto the cartridge spool inside the film cartridge 20 and the next unexposed frame is drawn off the unexposed film roll and to the backframe opening 22.

The main body part 12 supports various known camera components which are connected to the main body part before the main body part nested in the front cover part 14 and the rear cover part is fitted to the main body part. These camera components are a taking lens 26 for forming an image of a subject being photographed; a viewfinder 28 for viewing the subject and including a pair of optically aligned front and rear viewfinder lenses 30 and 32; a manually depressable shutter release button 34 for releasing a pivotally mounted shutter blade (not shown) behind the taking lens; a manually rotatable thumbwheel 36 for engaging one end of the cartridge spool (not shown) in order to wind an exposed frame of the filmstrip 24 into the film cartridge 20 after each picture is taken and to move an unexposed frame from the unexposed film roll on the film supply spool (not shown) to the backframe opening 22 for the next exposure; and an electronic flash 38 including a flash circuit board 40, a flash capacitor (not shown) located behind the circuit board, a flash emission lens 42, and a flash battery 44. Details of the flash circuitry are provided in prior art U.S. Pat. No. 5,574,337 issued Nov. 11, 1996.

As shown in FIGS. 1 and 2, a combination lens cover for uncovering/recovering the taking lens 26 and masking device for partially masking/completely masking (covering) the front viewfinder lens 30 is a single piece disk 46 which is rotatably supported on an axial pin 48 that is located in respective bearing pin-holes 50, 52 and 54 in the single-piece disk, the front cover part 14 and the main body part 12. The single-piece disk 46 has three different format rectangular-shaped mask openings 56, 58 and 60 and three identical rectangular-shaped lens openings 62, 64 and 66. The different format mask openings 56 and 58 are spaced ninety degrees apart; the different format mask openings 58 and 60 are spaced ninety degrees apart; and the different format mask openings 56 and 60 are spaced one-hundred eighty degrees apart. The identical lens openings 62, 64 and 66 are arranged radially inward of the respective mask openings 56, 58 and 60 about the axial pin 48.

Figure 3:
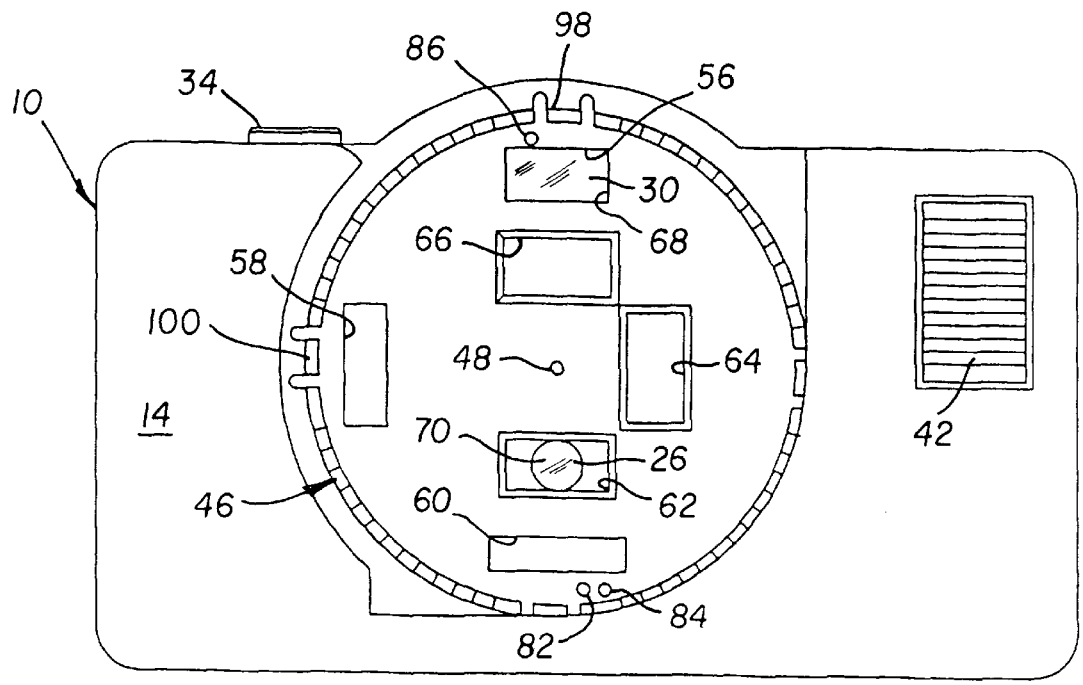
FIGS. 3–8 are front elevation views of the one-time-use camera depicting operation of the invention.
Figure 4:
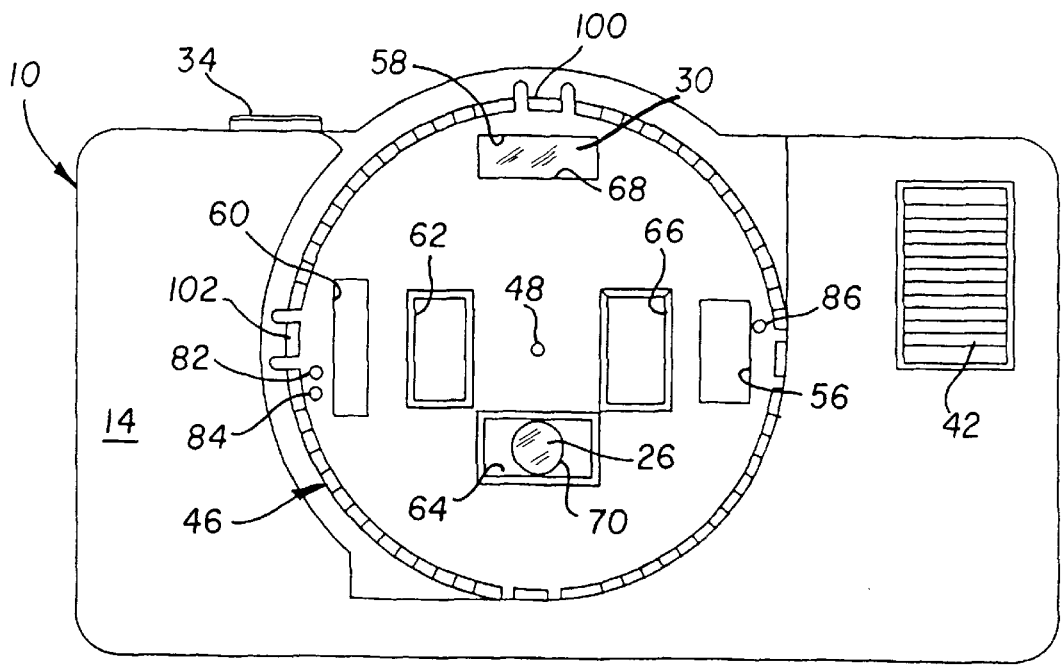
Figure 5:
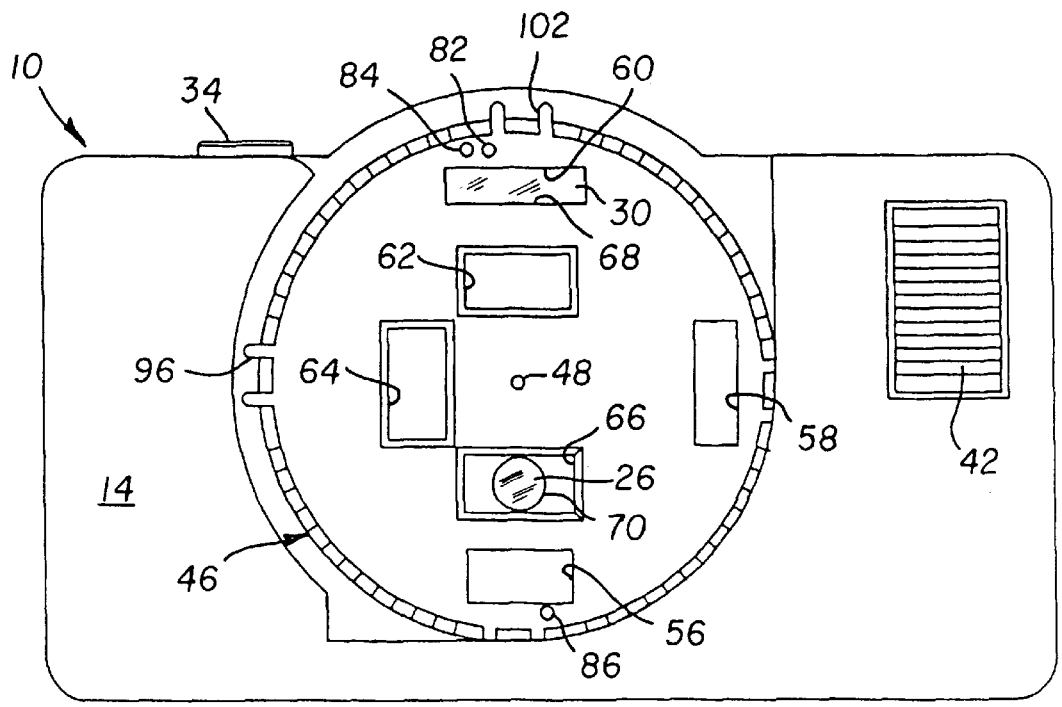
Figure 6:
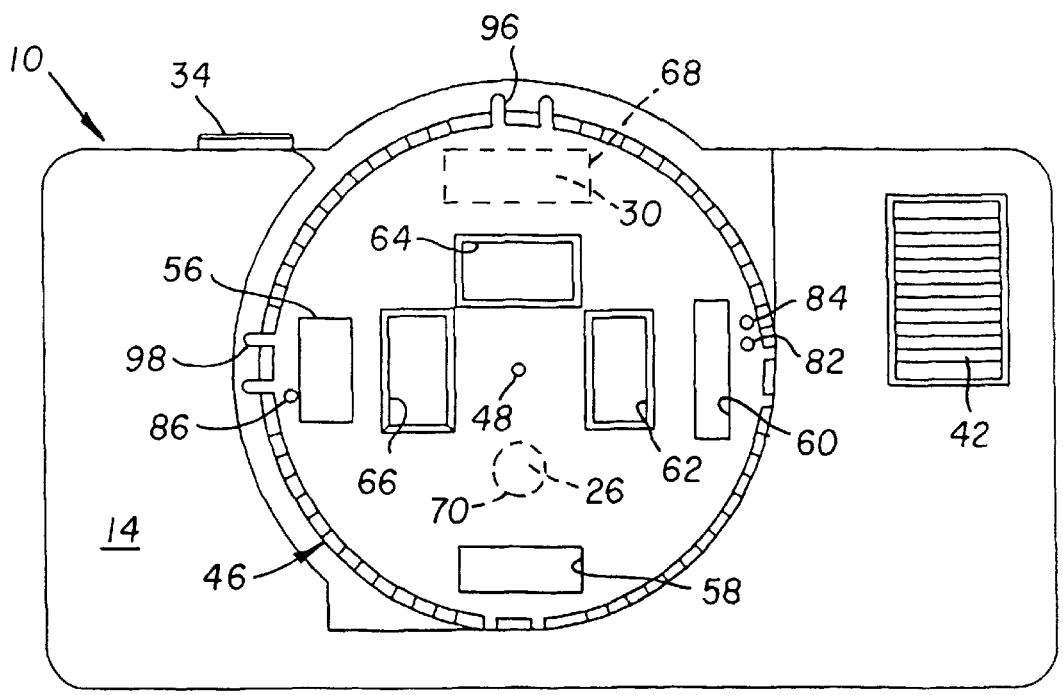

The respective mask openings 56, 58 and 60 have the standard "C" format, i.e. classic, the standard "H" format, i.e. substantially full frame, and the standard "P" format, i.e. panoramic, aspect ratios. See FIGS. 1–6. The single-piece disk 46 is intended to be manually rotated to locate any one of the "C" format, "H" format and "P" format mask openings 56, 58 and 60 in a partial masking position over a rectangular-shaped front viewfinder opening 68 in the front cover part 14 which is for the front viewfinder lens 30. This is done in order to frame a subject to be photographed in accordance with the desired "C", "H" or "P" format. As shown in FIG. 3, when the "C" format mask opening 56 in the single-piece disk 46 is in the partial masking position over the front viewfinder opening 68 in the front cover part 14, the lens opening 62 in the single-piece disk is over a circular-shaped lens opening 70 in the front cover part which is for the taking lens 26. Thus, the taking lens 26 is uncovered when the "C: format mask opening 56 is in the partial masking position. As shown in FIG. 4, when the "H" format mask opening 58 in the single-piece disk 46 is in the partial masking position over the front viewfinder opening 68 in the front cover part 14, the lens opening 64 in the single-piece disk is over the lens opening 70 in the front cover part. Thus, the taking lens 26 is uncovered when the "H" format mask opening 58 is in the partial masking position. As shown in FIG. 5, when the "P" format mask opening 60 in the single-piece disk 46 is in the partial masking position over the front viewfinder opening 68 in the front cover part 14, the lens opening 66 in the single-piece disk is over the lens opening 70 in the front cover part. Thus, the taking lens 26 is uncovered when the "P" format mask opening 60 is in the partial masking position. As shown in FIG. 6, when every one of the mask openings 56, 58 and 60 in the single-piece disk 46 are in respective non-masking positions not over the front viewfinder opening 68 in the front cover part 14, the lens openings 62, 64 and 66 in the single-piece disk are not over the lens opening 70 in the front cover part. Thus, the single-piece disk 46 completely masks the front viewfinder opening 68 in the front cover part 14 and the lens opening 70 in the front cover part.

As shown in FIGS. 1 and 2, the single-piece disk 46 has four evenly spaced detents or protuberances 72, 74, 76 and 78 for individually being received in a mating cavity 80 in the front cover part 14 to secure the single-piece disk in place. In FIG. 3, the detent 72 is received in the mating cavity 80. In FIG. 4, the detent 74 is received in the mating cavity 80. In FIG. 5, the detent 76 is received in the mating cavity 80. In FIG. 6, the detent 78 is received in the mating cavity 80.

Respective sets of ambient light receiving holes 82, 84 and 86, 88 and 90, and 92 and 94 are formed in the single-piece disk 46, the front cover part 14 and the main body part 12 which permit any one of three different binary encodements to be provided on the filmstrip 24 for each exposed frame. The two sets of holes 88 and 90 in the front cover part 14 and 92 and 94 in the main body part 12 are permanently aligned. The binary encodements to be provided on the filmstrip 24 are "1,1" for a "C" format selection, "0,0" for an "H" format selection and "0,1" for a "P" format selection. In FIG. 3, the holes 82 and 84 in the single-piece disk 46 are over the respective holes 88 and 90 to effect the "1,1" binary encodement. In FIG. 4, none of the holes 82, 84 or 86 in the single-piece disk 46 are over the respective holes 88 and 90 to effect the "0,0" binary encodement. In FIG. 5, the hole 86 in the single-piece disk 46 is over the hole 90 to effect the "0,1" binary encodement.

Figure 7:
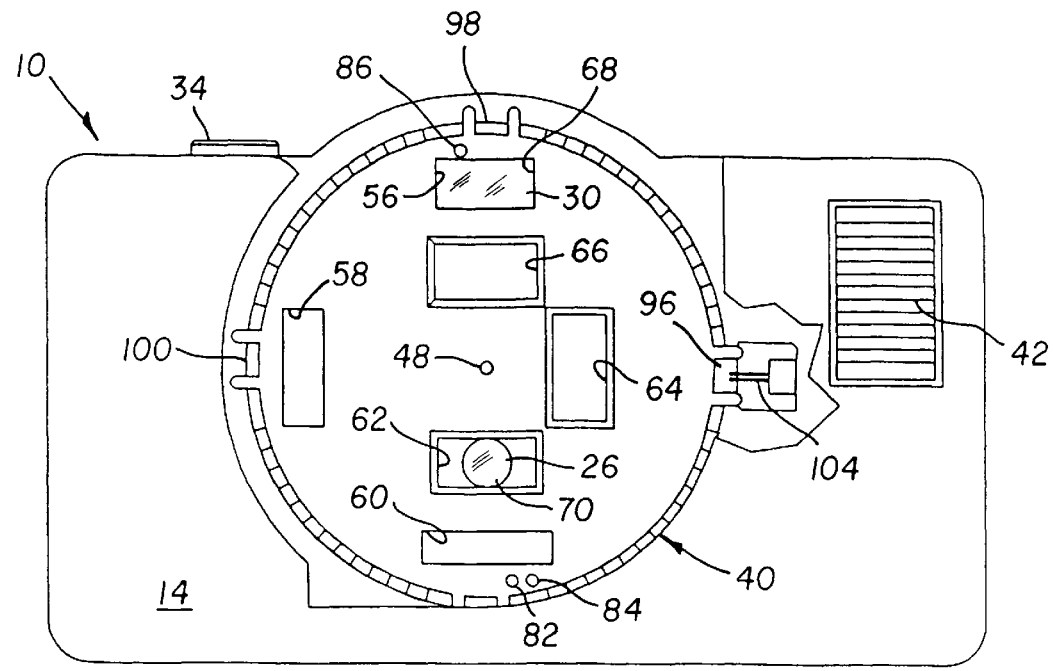
Figure 8:
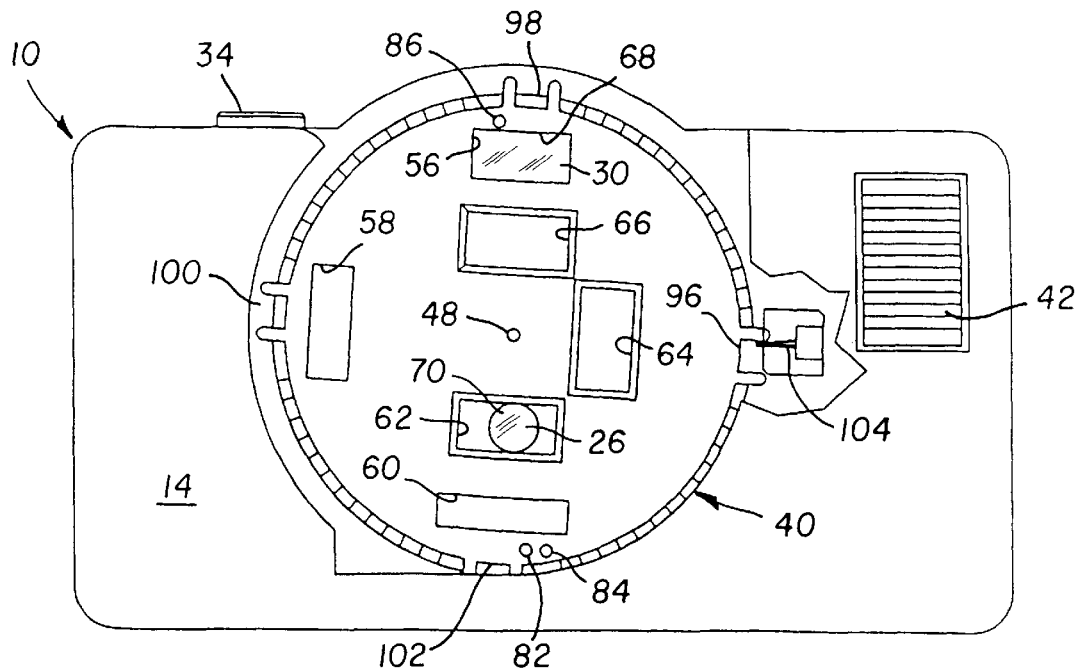

As shown in FIGS. 7 and 8, the single-piece disk 46 has four evenly spaced switch actuators 96, 98, 100 and 102 for individually closing a normally open flash switch 104 to initiate charging the flash capacitor (not shown) when the single-piece disk is rotated. Successive ones of the switch actuators 96, 98, 100 and 102 close the flash switch 104 as the single-piece disk 46 is rotated out of its respective rotational positions in FIGS. 3, 4, 5 and 6.

The invention has been described with reference to a preferred embodiment. However, it will be appreciated that variations and modifications can be effected by a person of ordinary skill in the art without departing from the scope of the invention.

PARTS LIST 10. one-time-use camera
12. main body part
14. front cover part
16. cartridge receiving chamber
18. unexposed film roll chamber
20. film cartridge
22. backframe opening
24. filmstrip
26. taking lens
28. viewfinder
30. front viewfinder lens
32. rear viewfinder lens
34. shutter release button
36. thumbwheel
38. electronic flash
40. flash circuit board
42. flash emission lens
44. flash battery
46. single-piece disk
48. axial pin
50. pin-hole
52. pin-hole
54. pin hole
56. mask opening
58. mask opening
60. mask opening
62. lens opening
64. lens opening
66. lens opening
68. front viewfinder opening
70. lens opening
72. detent
74. detent
76. detent
78. detent
80. cavity
82. light-receiving hole
84. light-receiving hole
86. light-receiving hole
88. light-receiving hole
90. light-receiving hole
92. light-receiving hole 94. light-receiving hole
96. switch actuator
98. switch actuator
100. switch actuator
102. switch actuator
104. flash switch

What is claimed is:

1. A camera comprising a viewfinder for viewing a subject to be photographed, a masking device for said viewfinder having a number of different format mask configurations, a taking lens for forming an image of the subject, and a lens cover for said taking lens, is characterized in that:

said masking device and said lens cover are supported to be moved at the same time for any one of said mask configurations to be in a masking position partially masking said viewfinder when said lens cover is not covering said taking lens and for every one of the mask configurations to be in respective non-masking positions not partially masking the viewfinder when the lens cover covers the taking lens.

2. A camera as recited in claim 1, wherein said masking device and said lens cover are united to form a single piece.

3. A camera as recited in claim 2, wherein a flash switch is capable of changing state to energize an electronic flash, and said single piece includes a number of switch actuators whose particular number is one more than the number of said mask configurations for individually changing the state of said flash switch to energize said electronic flash as the single piece is moved.

4. A camera as recited in claim 2, wherein said single piece includes a number of lens openings whose particular number is equal to the number of said mask configurations.

5. A camera as recited in claim 4, wherein said single piece is supported for rotation to move, and said lens openings are arranged radially inward of said mask configurations about a rotational axis of said single piece.

* * * * *